United States Patent [19]

Durenec

[11] Patent Number: 4,474,106
[45] Date of Patent: Oct. 2, 1984

[54] FLUIDIC SELF ADJUSTING SEAL ASSEMBLY

[75] Inventor: Peter Durenec, Annandale, Va.

[73] Assignee: The United States of America as represented by the Secretary of the Army, Washington, D.C.

[21] Appl. No.: 365,220

[22] Filed: Apr. 5, 1982

[51] Int. Cl.³ .............................. F16J 1/08; F16J 9/08
[52] U.S. Cl. ........................................ 92/159; 92/183; 277/3; 277/74; 277/188 A
[58] Field of Search ................... 92/83, 183, 182, 184, 92/185, 158, 159, 81, 82, 127, 156, 160, 174; 277/3, 27, 74, 75, 188 A, 188 R; 60/517

[56] References Cited

U.S. PATENT DOCUMENTS

| | | | |
|---|---|---|---|
| 759,582 | 5/1904 | Wilson | 92/183 |
| 1,234,972 | 7/1917 | Trist | 92/183 |
| 2,749,195 | 6/1956 | Kruger | 92/183 |
| 3,186,702 | 6/1965 | Taylor | 277/188 A |

FOREIGN PATENT DOCUMENTS

| | | | |
|---|---|---|---|
| 349248 | 5/1931 | United Kingdom | 92/158 |
| 929528 | 6/1963 | United Kingdom | 277/188 A |

Primary Examiner—Irwin C. Cohen
Attorney, Agent, or Firm—Anthony T. Lane; Milton W. Lee; Aubrey J. Dunn

[57] ABSTRACT

A fluidic bearing seal assembly comprised of a plurality of floating backing ring seals positioned in a plurality of annular grooves in a piston with at least one free-floating sealing wedge fitted to the outer peripheral edge of each backing ring for sliding along the cylinder wall. The piston has an inlet port and one way check valve means in the head thereof through which the working fluid is compressed during the compression stroke into a plurality of passageways that route the working fluid under pressure against said plurality of floating backing ring seals and into a pressure reservoir directly in contact with the cylinder wall and between adjacent backing ring seals to press the backing ring seals and seal wedges against the cylinder wall during the compression stroke and release the pressure from the ring seals and wedges during the return stroke of the piston.

10 Claims, 3 Drawing Figures

FLUIDIC SELF ADJUSTING SEAL ASSEMBLY

The invention described herein may be manufactured, used and licensed by the U.S. Government for governmental purposes without the payment of any royalties thereon.

BACKGROUND OF THE INVENTION

1. Field of the Invention

The invention is in the field of fluidic bearing dry piston seals which enclose a working fluid reservoir between the piston seals and the cylinder wall in which inlet port and check valve means accessible to the working volume equalize the pressure on both sides of the seal bearings during the compression stroke and release the reservoir pressure during the expansion stroke.

2. Description of the Prior Art

The use of lubricated seals in some operations of compressors, such as in compressors used in cryogenic operations, have the problem of working fluid leakage from the working space in the cylinder and egress of the oil lubricants in the piston drive area into the working space. Leakage of oil into the engine cylinder is detrimental to good operation since eventually it goes into suspension as fine droplets in the working fluid and is thereupon filtered out by the finely divided metallic matrix of the regenerator. This partial blockage of the matrix pore space increases the pressure drop through the regenerator which reduces the power output of the engine. The temperature of the hot parts then increases because less heat is absorbed in expansion. Perhaps increased fuel may be supplied to compensate for the reduced power which further increases the temperature of the hot parts. The increase in temperature causes the oil trapped in the regenerator to carbonize which further increases the pressure drop. This progressive and cumulative deterioration in performance continues until eventually the engine becomes overheated and either the heater tubes or the regenerator matrix burn out.

It is tempting to avoid these problems using prepacked sealed grease lubricated bearings, to use Oilite phosphor bronze oil impregnated bearings, or the many proprietary Teflon or Rulon bearings. These approaches are acceptable for experimental or prototype engines for short operating periods. However, for long term operation none of these approaches proved satisfactory, and it is likely that lubricating oil will continue to be used for the bearings in the crank mechanism. In that case, the problem of preventing egress of oil to the working space will need to be confronted and will likely be a difficult problem to overcome.

Carbonaceous materials, frequently impregnated with bronze, silver, or other metal powders are used as oil free bearing materials in many applications. Unfortunately, carbon loses its favorable lubrication properties in very dry atmospheres. Little published data is known about the use of carbon-based materials as bearings with hydrogen or helium working fluids at high pressure. Attempts to incorporate carbon-based materials in the seals and bearings of small cooling engines have not been found to be feasible.

SUMMARY OF THE INVENTION

The present invention is a pressure activated fluidic, or gas, bearing piston seal assembly using the working fluid itself as the lubricant without any oil or grease lubricants being involved. Some of the devices that are particularly adapted for the use of the present fluidic seal are the free piston Stirling engines or Stirling coolers, the Ericson cooler, or any external combustion engine. The fluidic bearing seals are pressed against the cylinder wall during the compression stroke and are released during the expansion stroke.

The present fluidic seal assembly is comprised of a plurality of annular grooves around the upper portion of a piston which have a dry seal means therein comprised of a plurality of backing ring seals having at least one beveled edge cut at about 45° from the outer periphery toward either an upper or lower width surface thereof and a free-floating sealing wedge form fitted into each beveled edge to slide along the cylinder wall wherein said backing ring seals are seated in the base of said annular grooves and are fluidically controlled. The fluidic seal assembly is further comprised of an inlet port and one way relief valve means in the head of said piston feeding to a plurality of evenly spaced radial passageways terminating evenly around said plurality of annular grooves. The backing ring seals have recessed both on the annular seating portion at the base of said annular grooves and at the passageway terminating side which are about 90° apart with access for working fluid flow between the two recesses. A pressure reservoir of working fluid is enclosed between the backing ring seals at the cylinder wall. The inlet port and one way relief valve means is in working contact with the working fluid in the compression volume and, during the compression stroke, routes the working fluid therethrough and into said plurality of passageways so that the working fluid is compressed into the pressure reservoir to provide a fluidic bearing between said plurality of backing ring seals and into the recesses to apply a pressure on the backing ring seals and the sealing wedges toward the cylinder wall. The pressure in the recesses and in the pressure reservoir is equal to the compression volume pressure that exists during the compression stroke along the space between the cylinder wall and the upper portion of the piston. Pressure on the inlet port and one way relief valve means is removed at the start of and during the expansion stroke and the one way relief valve means holds the pressurized working fluid therein, with the exception of leakage, or blow by if the working fluid is a gs, at the pressure reservoir and the sealing wedges along the cylinder wall back into the compression volume. The leakage or blow by during the expansion stroke also helps to prevent lubricant egress into the working fluid and working fluid compression volume. Annular corrugations around the lower portion of the piston provide means for slowing the instantaneous velocity of oil or lubricants and thus keeping them from the working fluid in the seal area.

The backing ring seals are preferably made of a resilient material, such as Rulon J or Teflon, from which the recesses and the beveled edges may be easily formed. The sealing wedges are preferably made of ceramic materials which have the qualities of low thermal expansion, resistance to wear, high fracture toughness, and low coefficient of friction. These sealing wedges may be chosen from sintered alumina ($Al_2O_3$), partially stabilized heat treated zirconia ($ZrO_3$), and either hot pressed silicon nitride ($Si_3N_4$) or boron carbide ($B_4C$).

The present fluidic seal assembly provides the following advantages:

(1) The piston is maintained centered in the cylinder to prevent piston or displacer creep;

(2) Mechanical wear, the production of debris from piston and cylinder wall wear, and the absorption of work in frictional degradation is virtually eliminated;

(3) The seals provide a fluidics spring and a linear fluidics bearing; and (4) Oil and grease contamination of the working fluid from the piston drive is kept at a minimum.

The present seal assembly may operate in various fluidic or gas compressor devices, and is especially suitable for use in cryogenic compressors with hydrogen, helium, or nitrogen as the working fluid.

The invention will be better understood by reference to the following detailed description when considered in reference to the following drawings.

DETAILED DESCRIPTION OF THE PREFERRED EMBODIMENT

Figure 1:
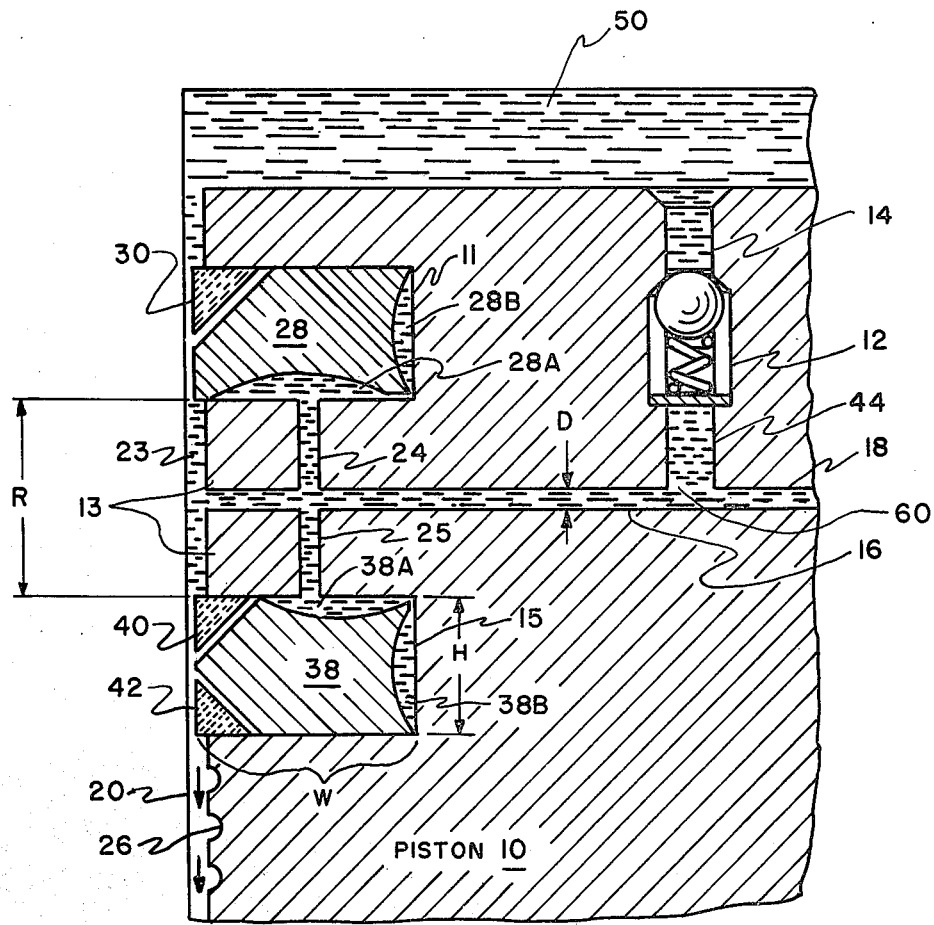
FIG. 1 is a partial cross-sectional view of a piston and the fluidic seal assembly.
Figure 2:
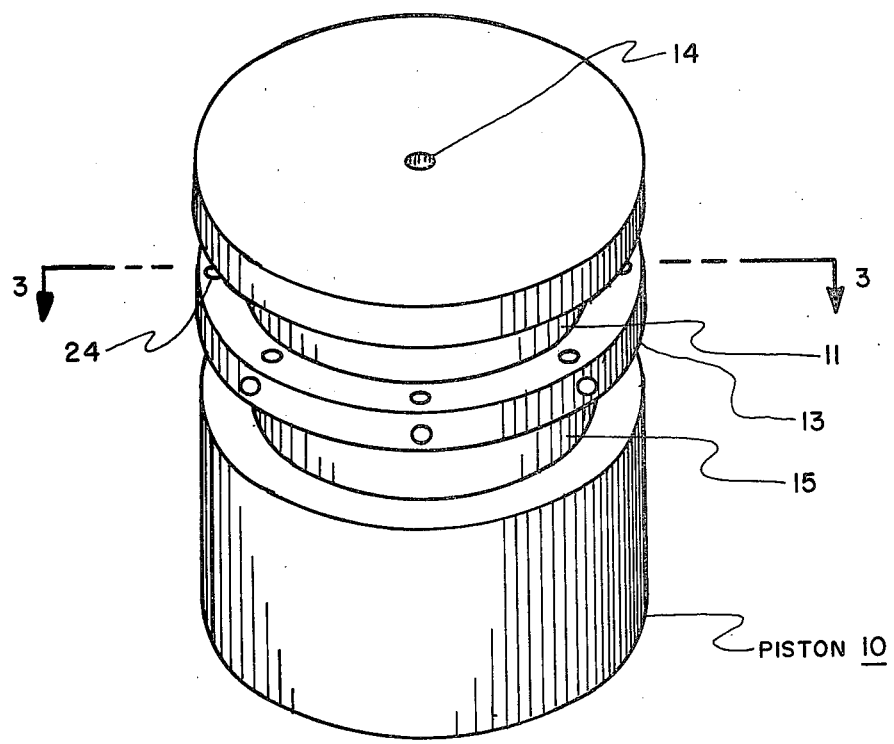
FIG. 2 shows a top portion view of the piston with two annular grooves therein.
Figure 3:
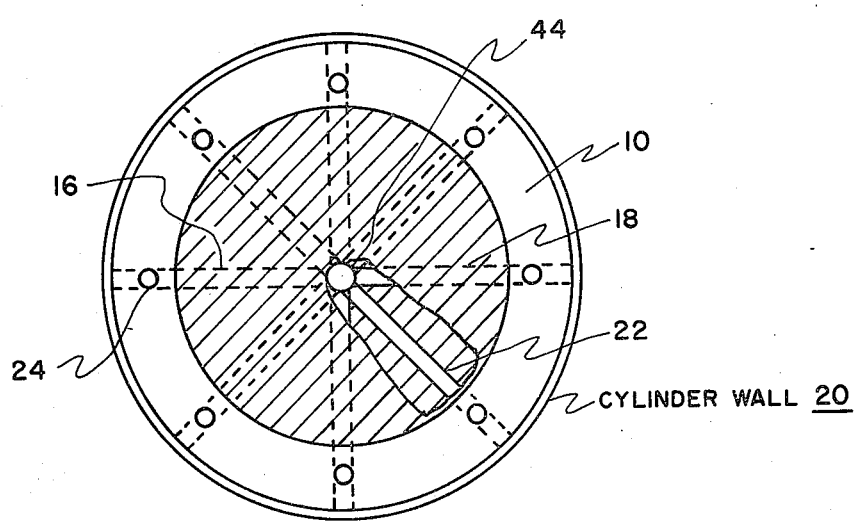
FIG. 3 shows a cut-out cross-section view along lines 3—3 of FIG. 2.

Referring now to the drawings and particularly to the embodiment as shown in FIG. 1, a piston 10 is partially shown in a cylinder wall 20 in which the working fluid is shown in the compression volume 50 and in an internal fluid volume 60 with access between volume 50 and volume 60 by way of the inlet port and one way relief valve means. The inlet port and one way relief valve means is comprised of inlet port 14 which is preferably a drilled hole in the geometrical center of the piston head that extends to a one way relief valve 12. Relief valve is preferably a ball check relief valve. The internal fluid volume 60 is comprised of the inner cavities into which the working fluid goes after passing through the one way relief valve 12. These cavities are comprised of the entrance port 44 that is initially drilled at the same time as the inlet port 14, a plurality of evenly spaced radial passageways shown more clearly in FIG. 3 of which three are represented by numeral 16, 18, and 22, a pressure reservoir 23, volumes formed by seal fluid supply lines 24 and 25, and recessed area volumes 28A, 28B, 38A, and 38B. The interaction of the volumes 50 and 60 will be explained more fully herein below with relation to the dry seal means. The dry seal means is comprised of a plurality of backing ring seals having at least one beveled edge on the outer periphery and a plurality of free-floating sealing wedges form fitted therein for sliding along the cylinder wall wherein the backing ring seals are in working contact with the working fluid. The dry seal means is disposed in a plurality of annular grooves around the upper portion of piston 10, two of which are shown as grooves 11 and 15 in FIGS. 1 and 2 cut out between piston portion 13. The preferred embodiment dry seal means will be explained herein as disposed in two adjacent grooves of the plurality of annular grooves. It should be understood that they may be more of these pairs and other arrangements of the pairs.

Look now more closely at FIG. 1 wherein the dry seal means and other features of the invention will become better understood. Backing ring seals 28 and 38 are placed respectively in annular grooves 11 and 15. Seal 28 has interconnected recesses 28A and 28B respectively at the passageway terminating side and on the annular seating portion along the base of annular groove 11. Likewise, seal 38 has interconnecting recesses 38A and 38B at the passageway terminating side and on the annular seating portion of annular groove 15. All of these recesses are shown exaggerated for clarity. Numerals 24 and 25 represent seal fluid supply lines respectively for seals 28 and 29. Seal 28 has one beveled edge on the compression volume side thereof into which a free-floating sealing wedge 30 is form fitted. Seal 38 has a beveled edge on both the compression volume side and the piston driving mechanism side into which free-floating sealing wedges 40 and 42 respectively are form fitted. A fluidic pressure reservoir 23 is formed between seals 28 and 38 and the cylinder wall 20 to provide a fluidic bearing between the moving piston and the cylinder wall. The length of reservoir 23, represented as R, is preferably about twice the height of either seal 28 or 38, represented as H. The width of either seal 28 or 38, represented as W, is preferably twice the height H. The inlet port 14, entrance port 44, all passageways, and supply lines 24 and 25 are preferably circular cavities that have a diameter of from 0.025 inch to 0.035 inch. The dimensions between the seals and wedges and the cylinder wall are less than for the depth of the pressure reservoir 23 between the cylinder wall 20 and the piston portion 13 such that the pressure on both sides of seal 28 and wedge 30 remain equal during the compression stroke and allows for leakage from the internal volume 60 back into the compression volume 50 during the expansion stroke.

During operation of the compressor device the compressed working fluid in compression volume 50 causes like pressure on the ball of the one way ball check relief valve 12 which opens valve 12 and allows the compressed working fluid to enter into all the cavities of the fluid internal volume 60. The fluidic pressure is therefore evenly distributed in the reservoir 23 and all of the recesses 28A, 28B, 38A, and 38B of the internal volume 60. Fluid pressure in the recesses bias seals 28 and 38 outward toward the cylinder wall which in turn transfers pressures against sealing wedges 30, 40, and 42. However, an essentially equal pressure exists on the cylinder wall side of the wedges and the outer periphery of the backing ring seals from the working fluid in the compression volume 50. Thus, wear of the wedges and seals are limited. In the compression stroke sealing wedges 30 and 40 are wedged toward the cylinder wall by the movement of the piston 10 toward the compression volume while sealing wedge 42 free-floats. During the return, or expansion stroke, wedge 42 is wedged closer to the cylinder wall while sealing wedges 30 and 40 free-float away from the cylinder wall and the ball of the one way check relief valve 12 is closed. During the expansion stroke when sealing wedge free-floats the working fluid in the internal volume 60 escapes between the cylinder wall 20 and wedge 30 back to the compression volume 50. Meanwhile wedge 42 keeps lubricants from the piston drive mechanism from entering the working fluid area. Annular corrugations 26 on the lower part of piston 10 help force lubricants out of the working space. The cycle repeats wherein working fluid enters through valve 12 again into the internal volume 60 during the compression stroke and helps force leakage by free-floating sealing wedge 30 during the expansion stroke by remaining closed.

I claim:

1. In combination, a fluidic bearing piston seal assembly and cylinder wall means comprising:

a cylinder wall means, a piston having a plurality of annular grooves disposed in adjacent pairs of grooves, said plurality of annular grooves defining at least a first pair of annular grooves around an upper portion head wherein each of said annular grooves has a base and a passageway terminating side and an inlet port and one way relief valve means connecting a working face of said piston open to a compression volume with an internal fluid volume, wherein said internal fluid volume is comprised of a plurality of evenly spaced radial passageways terminating between said plurality of annular grooves of said first pair at each of said passageway terminating sides and at a pressure reservoir; and a dry seal means comprised of a plurality of backing ring seals respectively positioned in said plurality of annular grooves, said pressuure reservoir being defined between a surface of each of said backing ring seals of said first pair, the periphery of said piston, and said cylinder wall means, each of said backing ring seals having at least one beveled edge on the outer periphery thereof positioned on the side closest to said piston working face with a free-floating sealing wedge form fitted into each of said beveled edges for sliding along said cylinder wall means and having interconnected recesses on an annular seating portion along said base of said plurality of annular grooves and on a passageway terminating side thereof, whereby said inlet port and one way relief valve means is in working contact with a working fluid in a compression volume and can pass a working fluid therethrough into said internal fluid volume during a compression stroke so that a working fluid is equally compressed in said internal fluid volume at said pressure reservoir and at said interconnectd recesses to press said backing ring seals and said sealing wedges against said cylinder wall means and during an expansion stroke a working fluid is held by said one way relief valve and flows back into a compression volume through a small opening between a compression volume side backing ring seal and said cylinder wall means by higher pressure now existing in said internal fluid volume relative to a lower pressure in a compression volume.

2. The combination as set forth in claim 1 wherein said sealing wedges are made of ceramic material.

3. The combination as set forth in claim 2 wherein said inlet port and one way relief valve means is comprised of an inlet port opening in the geometrical center of the piston head and a ball check relief valve.

4. The combination as set forth in claim 3 wherein said backing ring seals are made of a resilient material.

5. The combination as set forth in claim 4 wherein said sealing wedge ceramic material is sintered alumina ($Al_2O_3$).

6. The combination as set forth in claim 4 wherein said sealing wedge ceramic material is partially stablilzed heat treated zirconia ($ZrO_2$).

7. The combination as set forth in claim 4 wherein said sealing wedge ceramic material is hot pressed silicon nitride ($Si_3N_4$).

8. The combination as set forth in claim 4 wherein said sealing wedge ceramic material is hot pressed boron carbide ($B_4C$).

9. The combination as set forth in claim 5 wherein the lower portion of said piston has annular corrugations to force lubricants away from a working fluid in said dry seal means.

10. The combination as set forth in claim 9 wherein a further beveled edge and sealing wedge therein is provided on the backing ring seal furthest from said piston working face.

* * * * *